US007321901B1

(12) United States Patent
Blinn et al.

(10) Patent No.: US 7,321,901 B1
(45) **Date of Patent: *Jan. 22, 2008**

(54) APPLICATION SERVICE PROVIDER MODEL FOR MANUFACTURERS PRODUCT SPECIFICATION DATA

(75) Inventors: Arnold N. Blinn, Bellevue, WA (US); John A. Dunning, Jr., Seattle, WA (US); Jun Li, Seattle, WA (US); Trevor Traina, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 713 days.

This patent is subject to a terminal disclaimer.

(21) Appl. No.: 09/676,365

(22) Filed: Sep. 29, 2000

(51) Int. Cl.
*G06F 17/30* (2006.01)

(52) U.S. Cl. .................... 707/104.1; 707/100; 707/101

(58) Field of Classification Search .................. 707/10, 707/513, 4, 2, 501.1; 709/201, 202; 705/26–27, 705/80, 34–40, 200–203
See application file for complete search history.

(56) References Cited

U.S. PATENT DOCUMENTS

| | | | | |
|---|---|---|---|---|
| 5,410,598 | A * | 4/1995 | Shear | 705/53 |
| 5,894,310 | A * | 4/1999 | Arsenault et al. | 345/679 |
| 6,327,574 | B1 * | 12/2001 | Kramer et al. | 705/14 |
| 6,405,174 | B1 * | 6/2002 | Walker et al. | 705/14 |
| 6,418,441 | B1 * | 7/2002 | Call | 707/10 |
| 6,438,601 | B1 * | 8/2002 | Hardy | 709/229 |
| 6,560,633 | B1 * | 5/2003 | Roberts et al. | 709/202 |
| 6,708,161 | B2 * | 3/2004 | Tenorio et al. | 707/2 |
| 2001/0051905 | A1 * | 12/2001 | Lucas | 705/29 |
| 2002/0032620 | A1 * | 3/2002 | Benz et al. | 705/27 |
| 2005/0065981 | A1 * | 3/2005 | Blinn et al. | 707/104.1 |

OTHER PUBLICATIONS

US Patent No. 6,708,161 B2 with U.S. Appl. No. 60/235,945, filed Sep. 26, 2000.*
Arlen, Gary H. Telezoo.com gives boost to Telecom/IT shopping, Oct. 5, 1999, BRP Publications, newsletter, pp. 1-4.*
T. Critchlow, R. Musick & T. Slezak. Experiences Using a Meta-Data Based Integration Infrastructure. Article 2nd International Workshop on Biomolecular Informatics. Jul. 8, 1999.*
Athanasios Vavouras, Stella Gatziu, Klaus R. Dittrich. Incremental Refreshment of Data Warehouses: The SIRIUS Approach. Dept. of Information Technology, University of Zurich. Retrieved Mar. 3, 2006.*

* cited by examiner

*Primary Examiner*—Jeffrey Gaffin
*Assistant Examiner*—Neveen Abel-Jalil
(74) *Attorney, Agent, or Firm*—Woodcock Washburn LLP

(57) ABSTRACT

A business model is described in which one entity hosts, maintains, and provides a uniform interface for entering data into, a database of manufacturers product specification on behalf of a plurality of manufacturers. The entity then serves as an application service provider (ASP) with respect to that database, by allowing the manufacturers to access their respective product specification data in the database for any of a variety of uses outside of the database in exchange for some form of remuneration from those manufacturers.

14 Claims, 14 Drawing Sheets

MANUFACTURER ADMINISTRATION

Welcome: <manufacturer name>   Home   Help

Edit Product Information

Use this section to edit current product informaiton by changing the text in the following text and drop-down boxes.

Once you have completed editing the product information, click on the Update button. This will add the changes to the database and return you to the View/Edit screen.

To clear new information entered and start over, click on the Reset button.

[Update]  [Reset]

Product Data

| Id (req) | xyzxyzxyz |
|---|---|
| Name | DVP-S330 |
| Model (req) | DVP-S330 |
| Model Year | |
| Reference Image URL | |
| MSRP | 419.99 |
| Product Description (500 Character Limit) | Dolby Digital Ready DVD player with Optical/Coaxial Digital Output. |
| UPC | |
| Display (req) | ☐ |

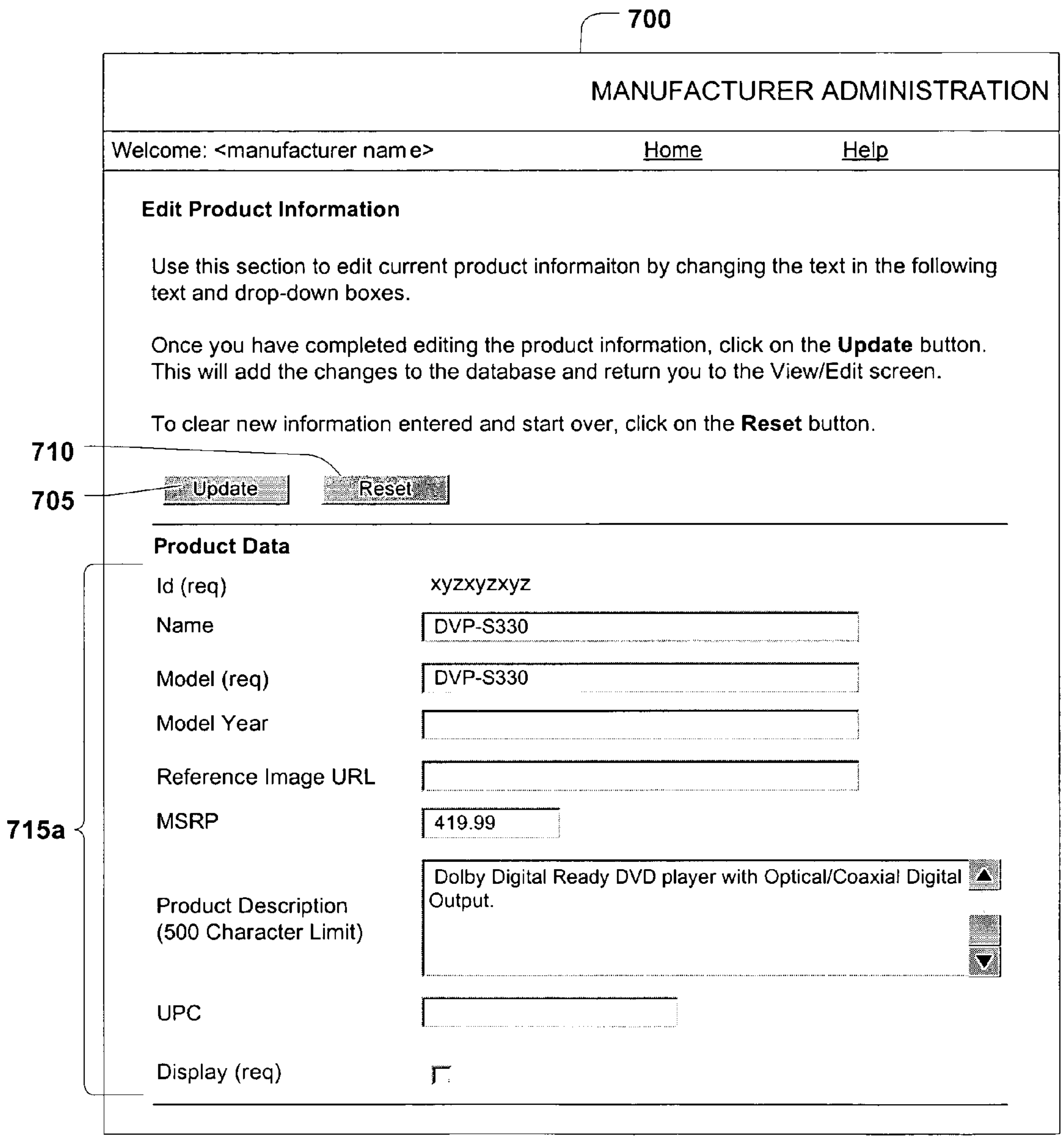

Fig. 7a

MANUFACTURER ADMINISTRATION

Welcome: <manufacturer name>　　　　　　　　Home　　　　Help

Import/Update products using data file from your local drive
Please click on Browse button to select a data file from your local drive. Or, you can type in the file name directly. Once you specify the desired data file, please click on Upload button to upload it to the server.

Products Overview
Total Products:　420
Online Products:　416
Total products in products category DVD players: 5
Online products in product category DVD players: 5

Download/Formats
Excel Template
XML Schema

View Upload History
Click here to view upload history

[Change Category]

Local Data File: [　　　　　] [Browse]

[Upload]

800
805
810
812
815
820
830

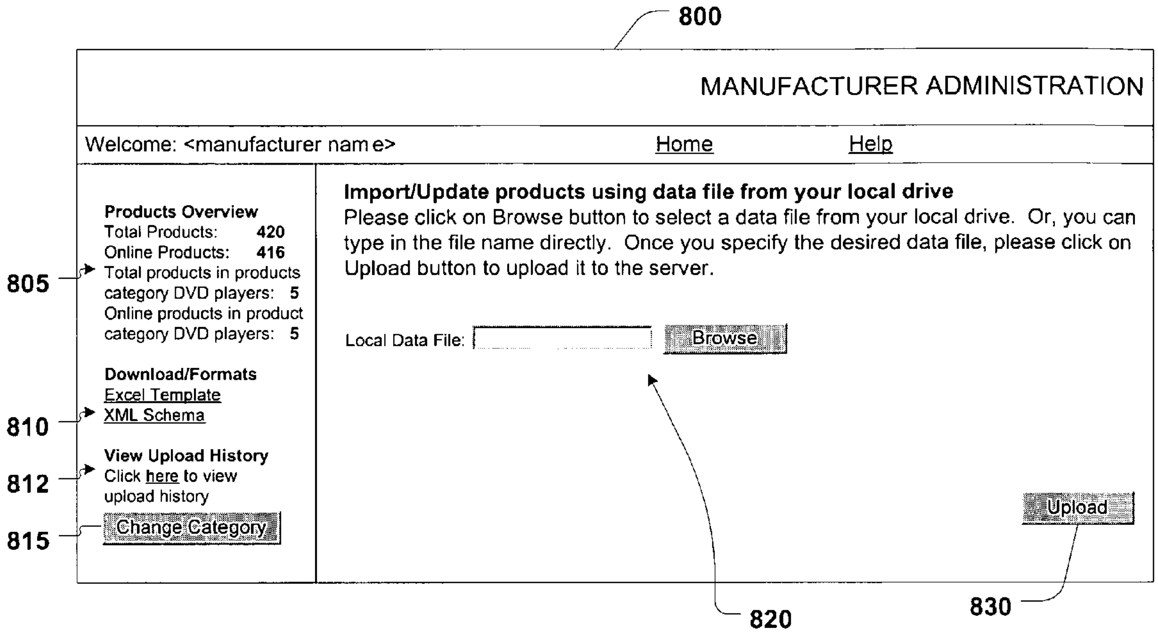

MANUFACTURER ADMINISTRATION

Welcome: <manufacturer name>     Home     Help

View product bulk upload history
Use this section to view your company's product bulk upload history.

Manufacturer Selection
905 →  ● View current manufacturer's bulk upload hstory only
○ View all manufacturers' bulk upload history

Log Selection
910 →  ○ View latest update only
● View all log history

Sorting Preference
915 →  [sort by descending time (latest first) ▼]

920 →  [Get Log]

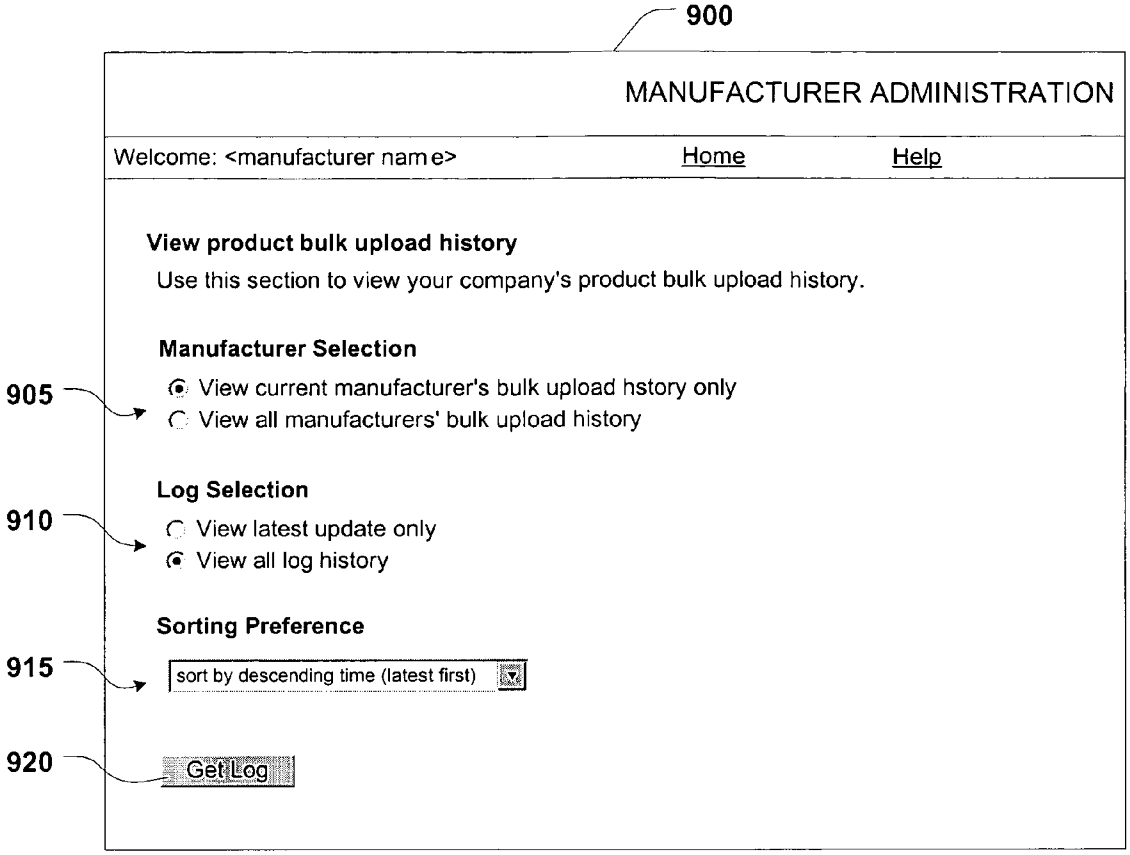

Fig. 9

APPLICATION SERVICE PROVIDER MODEL FOR MANUFACTURERS PRODUCT SPECIFICATION DATA

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

FIELD OF THE INVENTION

The present invention relates to application service providers, and more particularly, to an application service provider model for manufacturers product specification data.

BACKGROUND

Product manufacturers typically have information about the products that they manufacture in the form of product specification data. For example, a manufacturer of consumer electronic devices, such as DVD players, will have product specifications for each different model of DVD player that the manufacturer produces. These specifications may include model name, dimensions, and other features of the product, such as whether it is portable, what media formats it supports, what types of outputs it provides, etc.

Manufacturers often publish their product specification data, for example, in product catalogues and, increasingly today, via the World Wide Web (the "Web"). End-user customers, as well as merchants that resell manufacturers' products, will often use the product specification data to make purchasing decisions and to compare the features of one manufacturer's products against those of another manufacturer. One problem that hinders the ability of a consumer or merchant to compare products from different manufacturers is that different manufacturers of products in a given product class do not always use the same set of specifications for that class of products. For example, one manufacturer may specify the height, width, and depth of its products in that class, whereas another manufacturer may only specify the volume (e.g., cubic centimeters) of its products. Different manufacturers also may not agree on what features of a product are important to consumers and merchants, and thus some manufacturers will provide specifications on certain features and others may not.

Uniform specifications for products in a given product class is not the only problem that manufacturers face. They also often have a problem maintaining an up-to-date database of their product information. Many manufacturers have multiple divisions creating different product lines, have separate marketing organizations that often maintain catalog information in unstructured fashions, and typically have not had a strong need for a centralized database of their product information. As such, manufacturers often do not have an organizational infrastructure that is optimized around creating a central product database of the products they manufacture.

Because most manufacturers lack the necessary infrastructure to create and maintain a centralized database of product specifications for the products they manufacture, and because it is becoming increasingly important, particularly with the advent of online shopping via the Internet, that manufacturers provide uniform specifications for products in a given product class, there is a need for systems and methods that enable and encourage manufacturers to describe the features and other specifications of their products in a consistent and uniform manner and to maintain that data in a centralized database. The present invention addresses this need.

SUMMARY

The present invention is directed to a new business model in which one entity hosts, maintains, and provides a uniform interface for entering data into, a database of manufacturers product specifications on behalf of a plurality of manufacturers. The entity then serves as an application service provider (ASP) with respect to that database, by allowing the manufacturers to access their respective product specification data in the database for any of a variety of uses in exchange for some form of remuneration from those manufacturers.

In greater detail, this method may comprise (a) hosting on a server of the entity a database of specification data of products of a plurality of different manufacturers, the product specification data in the database being arranged in predefined product classes; (b) defining, for each product class, a schema for the entry of specification data of products in that product class; (c) providing an interface for use by the manufacturers for entry of new product specification data into the database and for modifying existing product specification data in the database, the interface requiring each manufacturer to use a same schema when entering or modifying product specification data in a particular product class; and (d) in exchange for remuneration from a given manufacturer, providing that manufacturer with access to the interface and to its respective product specification data in the database for use outside of the database. Encouraging the use among manufacturers of a common set of specifications for each product class within the database will ensure that different manufacturers describe the features and specifications of their products in a consistent and uniform manner, thus making the data more valuable to third party users of the data, such as consumers and merchants selling the products.

Manufacturers can utilize this service in a variety of ways, including (1) querying data from the database into an HTML authoring tool to create static HTML pages for their own Web sites, (2) querying data from the database in real-time, but displaying that data on their own sites, (3) paying the hosting entity to build product information pages on its server from the manufacturer's data and then linking to those pages from the manufacturer's own Web site (with or without links back to the manufacturer's site), and (4) partnering with the hosting entity to generate a co-branded Web site or page that is built from the information in the database. The data can also be used in the context of an online shopping or merchandizing Web site to provide a consistent link to its product information from a number of different merchants that sell its products on the site. Additionally, a manufacturer can use this service to outsource the hosting and maintenance of a database of the manufacturer's product specifications.

The hosting entity may charge a fee for the hosting, maintaining, and providing access to, the database. For example, the hosting entity may charge a fee to each manufacturer that uses the database. The fee may or may not be in the form of a monetary payment. The fee may take the form of a one-time payment to establish an account with the hosting entity, a monthly service fee, a per transaction fee based either on the amount of product specification data stored in the database or on the volume of queries to the database, or some combination of these kinds of fees. Alternatively, the hosting entity can provide the service for free, relying instead on other business benefits of hosting the manufacturers product specification data. For example, the hosting entity may provide the service in exchange for an agreement from the manufacturers that the hosting entity can use the product specification data in connection with some other business model, such as an online shopping or merchandizing Web site, from which the hosting entity derives revenue.

A system for implementing the novel business method of the present invention comprises a database of specifications of products of a plurality of different manufacturers and an interface for use by the plurality of manufacturers for the entry of specifications of products into the database. The product specifications in the database are arranged in predefined product classes. A schema is defined for each product class for the entry of specification data of products in that product class. The interface of the system requires each manufacturer to use the defined schema for a given product class when entering product specification data for products in that class. The interface further provides each manufacturer with access to its respective product specification data in the database for use outside of the database.

Other features and advantages of the present invention will become evident hereinafter.

BRIEF DESCRIPTION OF THE DRAWINGS

The foregoing summary, as well as the following detailed description of the invention, is better understood when read in conjunction with the appended drawings. For the purpose of illustrating the invention, various embodiments are shown in the drawings, it being understood, however, that the invention is not limited to the specific methods and instrumentalities disclosed. In the drawings:

FIGS. 4 through 10 illustrate further details of a graphical user interface of the Manufacturer Administration Tool of FIG. 3;

DETAILED DESCRIPTION OF THE INVENTION

Figure 1:
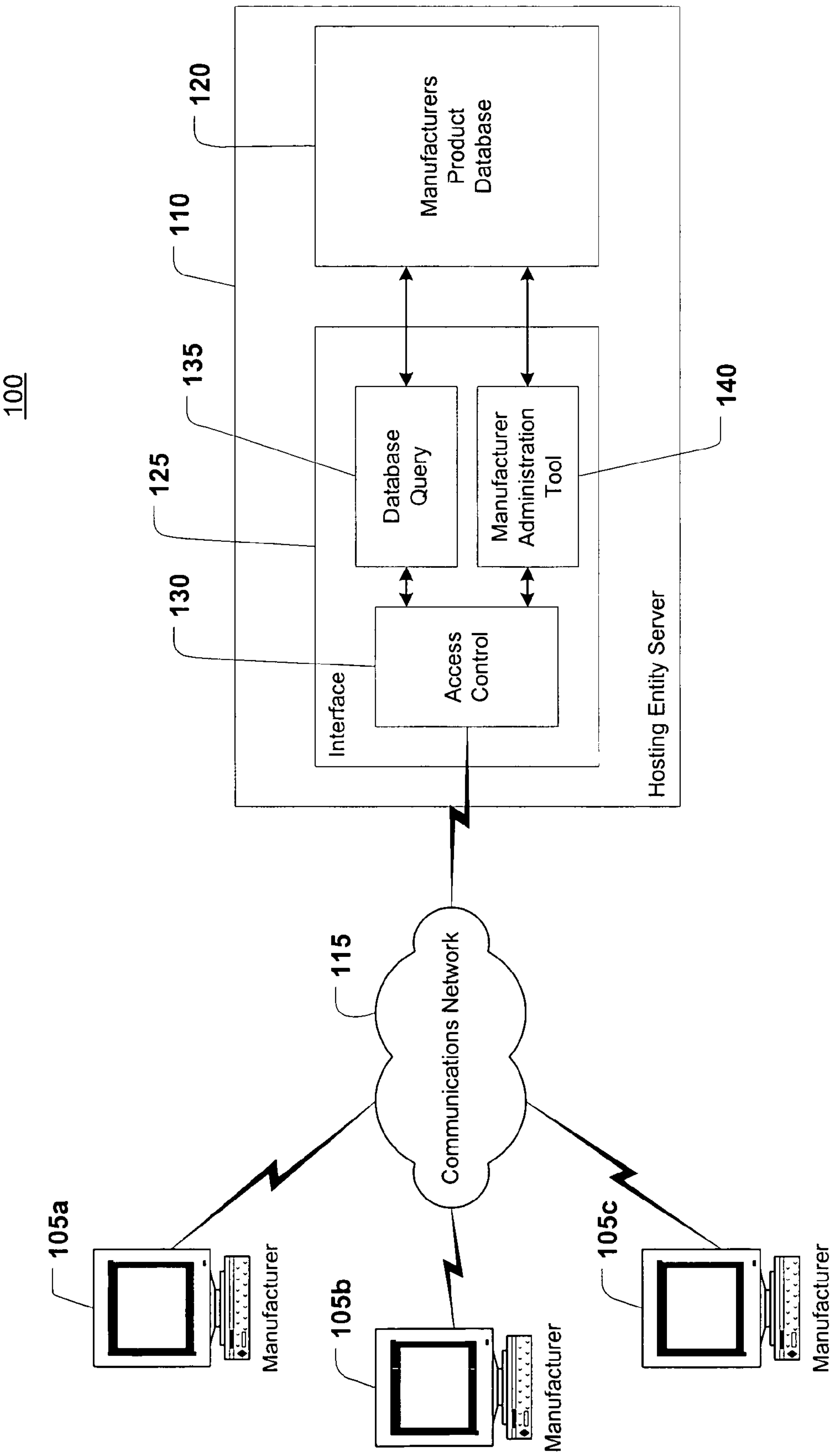
FIG. 1 is a block diagram of a system for enabling an entity to serve as an application service provider with respect to product specification data of a plurality of manufacturers, in accordance with an embodiment of the present invention.

The present invention is directed to a new business model in which one entity hosts, maintains, and provides a uniform interface for entering data into, a database of manufacturers product specification on behalf of a plurality of manufacturers. The entity then serves as an application service provider (ASP) with respect to that database, by allowing the manufacturers to access their respective product specification data in the database for any of a variety of uses in exchange for some form of remuneration from those manufacturers. One embodiment of this business method comprises: (a) hosting, on a server of the entity, a database of specification data of products of a plurality of different manufacturers, the product specification data in the database being arranged in predefined product classes; (b) defining, for each product class, a schema for the entry of specification data of products in that product class; (c) providing an interface for use by the manufacturers for entry of new product specification data into the database and for modifying existing product specification data in the database, the interface requiring each manufacturer to use a same schema when entering or modifying product specification data in a particular product class; and (d) in exchange for remuneration from a given manufacturer, providing that manufacturer with access to the interface and to its respective product specification data in the database for use outside of the database.

Manufacturers can utilize this service in a variety of ways, including (1) querying data from the database into an HTML authoring tool to create static HTML pages for their own Web sites, (2) querying data from the database in real-time, but displaying that data on their own sites, (3) paying the hosting entity to build product information pages on its server from the manufacturer's data and then linking to those pages from the manufacturer's own Web site (with or without links back to the manufacturer's site), and (4) partnering with the hosting entity to generate a co-branded Web site or page that is built from the information in the database. The data can also be used in the context of an online shopping or merchandizing Web site to provide a consistent link to its product information from a number of different merchants that sell its products on the site, as described more fully below.

Additionally, a manufacturer can use this service to outsource the hosting and maintenance of a database of the manufacturer's product specifications. Encouraging the use among manufacturers of a common set of specifications for each product class within the database will ensure that different manufacturers describe the features and specifications of their products in a consistent and uniform manner, thus making the data more valuable.

The hosting entity may charge a fee for the hosting, maintaining, and providing access to, the database. For example, the hosting entity may charge a fee to each manufacturer that uses the database. The fee may or may not be in the form of a monetary payment. The fee may take the form of a one-time payment to establish an account with the hosting entity, a monthly service fee, a per transaction fee based either on the amount of product specification data stored in the database or on the volume of queries to the database, or some combination of these kinds of fees. Alternatively, the hosting entity can provide the service for free, relying instead on other business benefits of hosting the manufacturers product specification data. For example, the hosting entity may provide the service in exchange for an agreement from the manufacturers that the hosting entity can use the product specification data in connection with some other business model, such as an online shopping or merchandizing Web site, from which the hosting entity derives revenue.

Referring now to the drawings, wherein like numerals represent like elements throughout, FIG. 1 is a block diagram of a system 100 for carrying out the new business method of the present invention. As shown, the system generally has a client-server architecture in which a number of client computers, e.g., clients 105*a-c*, operated by a plurality of different product manufacturers communicate over a network 115 with a server computer 110 operated by a hosting entity. The communications network 115 may comprise the Internet, an intranet, or any other hardwired or wireless network, including for example, a local area network (LAN), a wide area network (WAN), or a cellular, wireless, microwave, or satellite network. The term "Internet" refers commonly to the collection of networks and gateways that utilize the TCP/IP suite of protocols, which are well-known in the art of computer networking. TCP/IP is an acronym for "Transmission Control Protocol/Internet Protocol," a software protocol developed by the Department of Defense for communication between computers. The Internet can be described as a system of geographically distributed remote computer networks interconnected by computers executing networking protocols that allow users to interact and share information over the networks. Because of such wide-spread information sharing, remote networks such as the Internet have thus far generally evolved into an "open" system for which developers can design software applications for performing specialized operations or services, essentially without restriction.

Generally, in a client-server architecture of the type illustrated in FIG. 1, a client (e.g., clients 105*a-c*) may be a process (i.e., roughly a set of instructions or tasks) that requests a service provided by another program. The client process utilizes the requested service without having to "know" any working details about the other program or the service itself. A client is usually a computer or computer program that accesses shared network resources provided by other computers, i.e., servers (e.g., server 110).

Clients and servers can communicate with one another utilizing the functionality provided by the Hypertext-Transfer Protocol (HTTP). The World Wide Web (WWW) or, simply, the "Web," includes those servers adhering to this standard (i.e., HTTP) which are accessible to clients via a computer or data-processing system network address such as a Uniform Resource Locator (URL). The network address can be referred to as a Uniform Resource Locator address. For example, a client and server may be coupled to one another via TCP/IP connections for high-capacity communication. Active within the client may be a first process which establishes the connection with the server and presents information to the user. The server itself executes corresponding server software that presents information to the client in the form of HTTP responses. The HTTP responses may correspond to "web pages" constructed from a Hypertext Markup Language (HTML), or other server-generated data. Each web page can also be referred to simply as a "page."

A client typically displays the information provided through the network by the server, using a software application known as a browser. Most browsers have modem graphical user interfaces that are capable of displaying and manipulating various types of data. A graphical user interface is a type of display format that enables a user to choose commands, start programs, and see lists of files and other options by pointing to pictorial representations (icons) and lists of menu items on the screen. Choices can be activated generally either with a keyboard or a mouse. Internet services are typically accessed by specifying a unique network address (i.e., typically with a Uniform Resource Locator). The Uniform Resource Locator address has two basic components, the protocol to be used and the object pathname. For example, the Uniform Resource Locator address, "http://www.uspto.gov"(i.e., home page for the U.S. Patent and Trademark Office), specifies a hypertext-transfer protocol ("http") and a pathname of the server ("www.uspto.gov"). The server name is associated with one or more equivalent TCP/IP addresses.

Referring still to FIG. 1, the host entity server 110 comprises a database 120 of specifications of products of a plurality of different manufacturers. The product specifications in the database 120 are arranged in predefined product classes, as described more fully below.

The server 110 further comprises an interface 125 to the network 115, and more particularly, to the client computers 105*a-c* of each manufacturer. As shown, the interface 125 comprises an access control component 130, which, for example, authenticates each manufacturer by requiring a username and password combination to logon to the server 110. The access control component 130 may also provide other security functionality, such as data encryption and other secure communications techniques. The access control component 130 only permits a manufacturer to view and edit the data for the products of that manufacturer. No manufacturer is permitted access to the product specification data of another manufacturer. In other embodiments, however, such access may be permitted in circumstances where two or more manufacturers agree to shared access to the product specification data of each other.

The interface 125 further comprises a Manufacturer Administration Tool (MAT) 140 that is used by each manufacturer to add and modify the specification data for its products in a given product class. As described more fully hereinafter, there is defined, for each product class, a common schema that every manufacturer must use for the entry of specification data of products in that product class.

The interface 125 further comprises a query component 135 that enables each manufacturer to query or otherwise access its respective product specification data in the database for use outside of the database. For example, the query component 135 may permit each manufacturer to query data from the database in a form that the manufacturer can use with an authoring tool to create Web pages for a Web site (not shown) of the manufacturer. Alternatively, the query component 135 may permit a manufacturer to query data from the database in real-time for immediate insertion into and display on one or more pages of a Web site of the manufacturer. As another alternative, the manufacturer may have the hosting entity build product information pages on its server 110 from the manufacturer's data and, and the query component 135 can then enable the manufacturer to link to those pages from the manufacturer's own Web site (with or without links back to the manufacturer's site). Also, the manufacturer may partner with the hosting entity to generate a co-branded Web site or page(s) that are built from the information in the database. As mentioned above, in accordance with the new business model of the present invention, use of the interface 125 and database 120 will require some form of remuneration from the manufacturer.

Architecturally, the query component can be implemented in a variety of ways. For example, in embodiment shown, the query component may be restricted (i.e., only available to the manufacturer), in which case access to the query component is through the access control component 130. The query component 135 may or may not be integrated into (i.e., a "part" of) the MAT 140. In other embodiments, the query component 135 may be available to anyone (i.e., not requiring authentication through the access control component 130), as in the case, for example, of an online merchant querying data for display in connection with a product offer on its site, or a consumer application that accesses the data for product comparison purposes.

Figure 2:
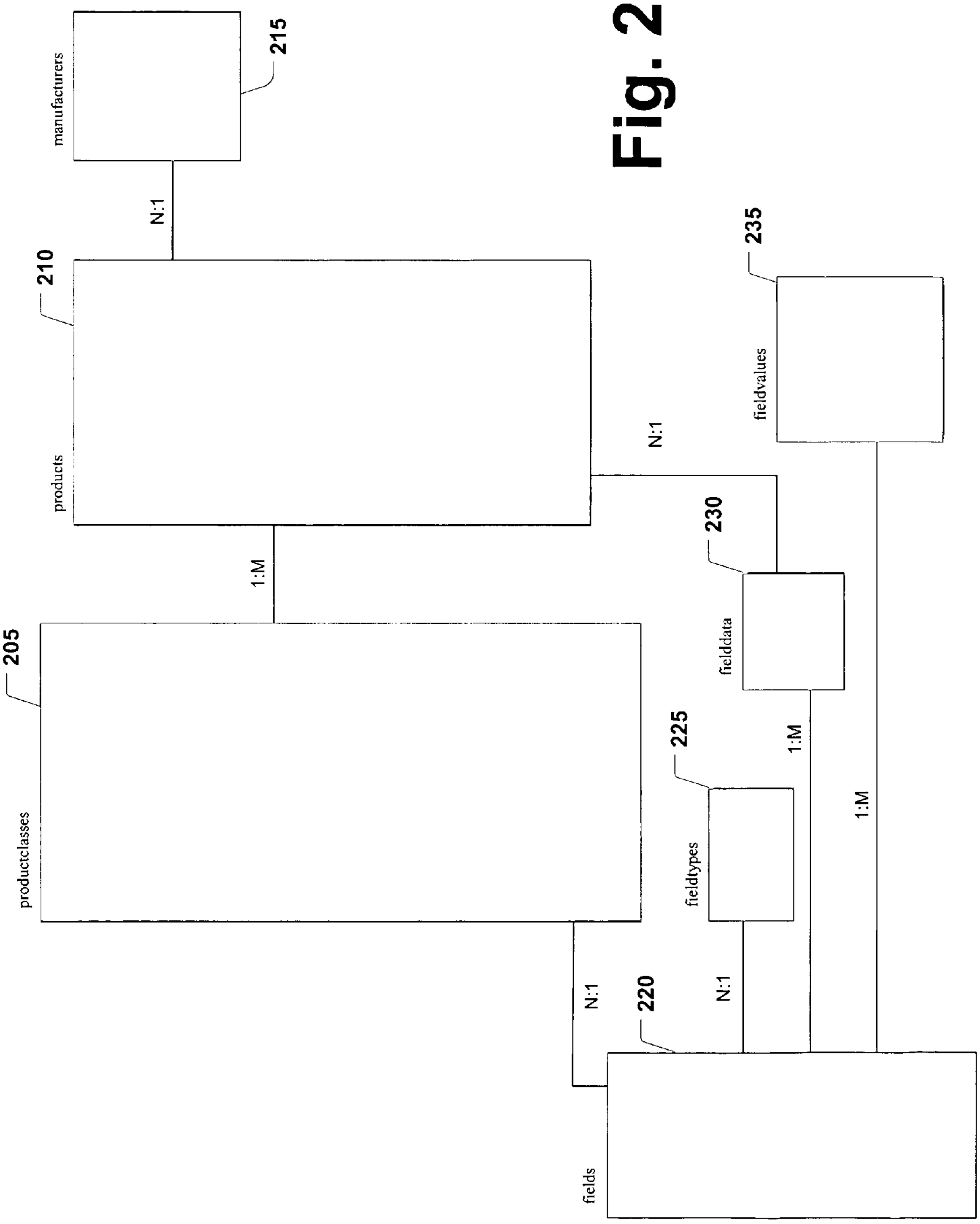
FIG. 2 graphically illustrates further details of a database of manufacturer product specifications, in accordance with the present invention.

FIG. 2 graphically illustrates the overall schema of the database 120, in accordance with one embodiment thereof. As shown, the database is arranged in tables titled "product classes" 205, "products" 210, "manufacturers" 215, "fields" 220, "field types" 225, "field data" 230, and "field values" 235. A product in table 210 may be assigned to a product class in table 205. Thus, as shown, there is a one-to-many ("1:M") relationship between product classes and products. "DVD Players" is an example of one product class, and "Televisions" may be another.

All products have some common information, such as product name, UPC number, model name, and Manufacturer's Suggested Retail Price (MSRP), which is stored for each product in the product table 210. In addition, most products will have some product class dependent information. For example, a DVD player that belongs to the product class "DVD Players" may have information concerning media formats that the player can read, whether it has an internal Dolby Digital 5.1 decoder, what digital outputs it has, what audio D/A converter it uses, whether it is portable, its color, its weight, and so on. This kind of product class dependent information is stored in the fields, field values, and field data tables 220, 230, and 235. Specifically, the fields table 220 records the product class dependent schema, i.e., what fields this particular product class has, such as, "format," "weight," "color," etc. The field values table 235 records the possible values for each field if the field type (stored in table 225) is a SELECT type meaning that it has multiple value choices, or a value range if its type is NUMERIC. The field data table 230 records the specific data (i.e., a product's specifications) for a given field. Table 1 shows the different product class dependent schema (i.e., fields) for two different product classes, "DVD Players" and "Televisions."

TABLE 1

| Product class "DVD players" has fields | Product class "Televisions" has fields |
|---|---|
| Format | Picture in picture (PIP) |
| Internal Dolby Digital 5.1 Decoder | Twin tuner picture in picture |
| Digital outputs | Surround sound |
| Audio D/A converter type | Stereo reception |
| | High-contrast screen |
| Portable | Comb filter |
| Color | Noise reduction |
| Weight (lbs) | Volume correction |
| Coaxial A/V connection | Headphone jack |
| | Parental control |
| Composite output | Front A/V inputs |
| Digital compression (MPEG) | A/V inputs |
| | S-video input |
| Height (Inches) | Sleep timer |
| Width (Inches) | Universal remote |
| Depth (Inches) | Favorite channel file |
| | Component storage |
| | Swivel base |
| | Horizontal resolution |
| | Commercial skip |
| | Variable audio outputs |

TABLE 1-continued

| Product class "DVD players" has fields | Product class "Televisions" has fields |
|---|---|
| | Closed caption |
| | Multi-lingual on screen display |
| | Surround sound detail |
| | Number of A/V inputs |
| | Upgraded speakers |
| | Aspect ratio |
| | Speaker detail |
| | Dolby Digital 5.1 |
| | Type of TV |
| | Component video input |
| | Scan doubler |
| | Digital technology |
| | SVGA input |
| | Digital ready |
| | HDTV |
| | Screen size |

Thus, each product class has a predefined schema, as reflected in the fields table 220. According to the present invention, the interface 125, in particular, the MAT 140, requires that each manufacturer that wishes to enter product specification data for products of a given product class do so using the predefined schema for that class. This will ensure uniformity of products specification data across manufacturers.

As further shown in FIG. 2, the database 120 also contains a table 215 that contains account and other information for each manufacturer that has subscribed to the service. As shown by the designation "N:1", each manufacturer may be associated with one or more "products" in table 210 of the database 120.

Figure 3:
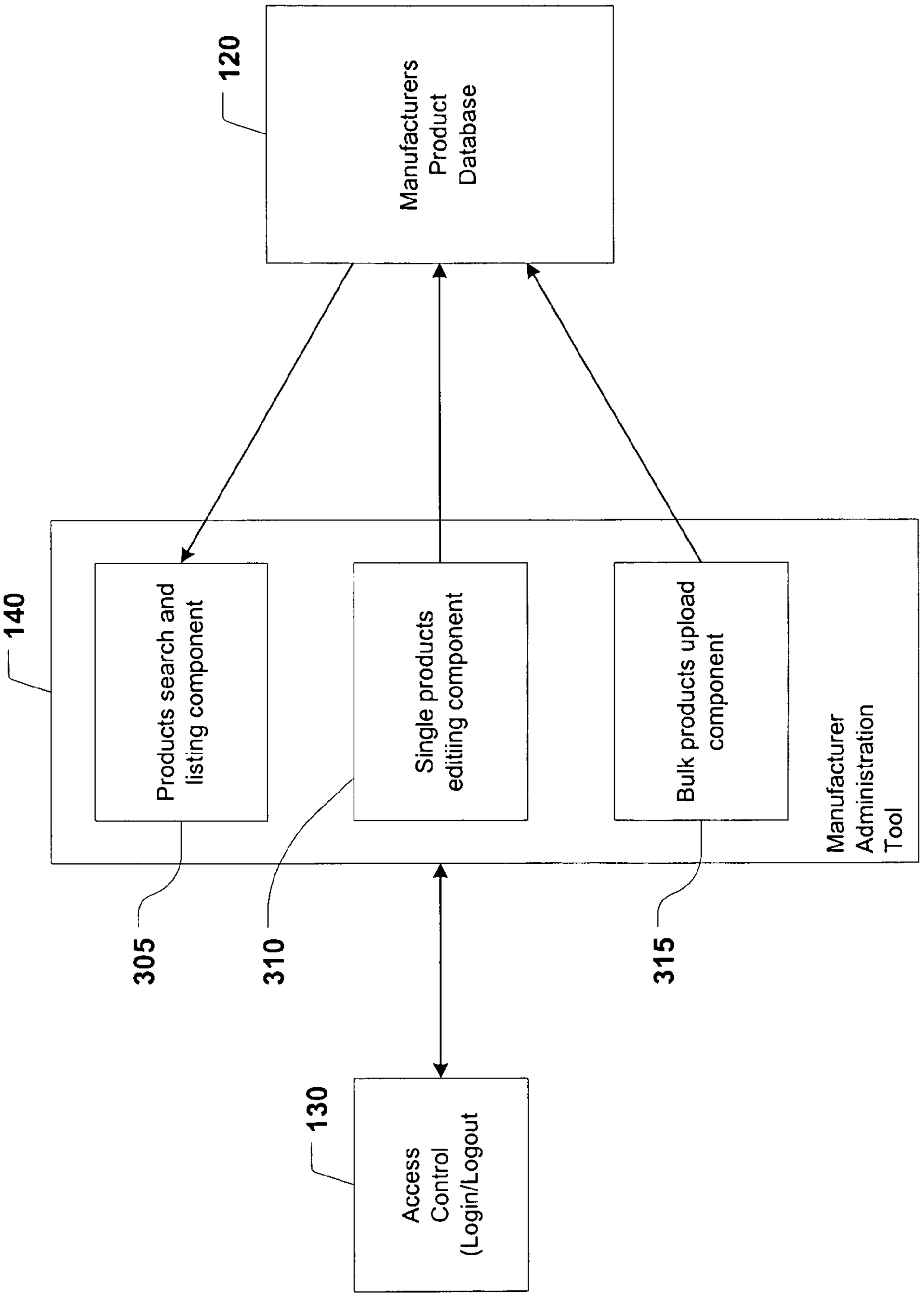
FIG. 3 is a block diagram providing further details of a Manufacturer Administration Tool that is part of the interface of the system of FIG. 1, in accordance with the present invention.

FIG. 3 provides further details of the system of FIG. 1, in particular the MAT 140. As shown, the MAT 140 comprises a products search and listing component 305 that a manufacturer can use to search for and list product specification data for its products stored in the database. This component lets the manufacturer view its product specification data. Products are listed under the different product classes. For example, one manufacturer may have products in a number of different products classes, such as answering machines, bookshelf speakers, camcorders, DVD players, and the like. Remember that each product class has different features or specifications. For example, answering machines have specifications like "digital or cassette," "number of lines machine can use," "type of machine," "room monitor," and "caller ID," while camcorders have specifications like "display type," "format," "built-in auto light," "LCD screen monitor," "remote," and "computer editing capable." Each product class has a predefined schema that reflects the different features or specifications of that class of product; the schema being represented in a respective record of the field table 220 of the database 120, as described above. The search and listing component 305 uses the schema of a given product class to generate product search criteria specific to a chosen class. The component 305 enables a manufacturer to view a list of that manufacturer's products in the database 120 for a single product class at a time. The product search criteria can be very strict, such as "show all camcorders that have VHS format, built-in auto light, and LCD screen monitor". The search and listing component 305 will return all of the manufacturer's products that fit the criteria. Additionally, the search and listing component 305 enables a manufacturer to export its product specification data from the database 120 for a given product class in a variety of formats, including but not limited to, XLS (Excel spreadsheet), CSV (comma separated value) or XML (Extensible Markup Language) format to its local client computer (e.g., client computer 105*a*) for updating.

The MAT 140 further comprises a single product editing component 310 that a manufacturer can use to add and edit the product specification data for a single product in the database. This component is described more fully below.

A third component of the MAT 140 is a bulk products upload component 315 that enables a manufacturer to add or edit the product specification data for multiple products in a single data feed. Based on the schema of a product class (i.e., the different fields of table 220 representing different specifications for products of that class), the bulk products upload component 315 generates an import file template (identical in schema format to the export format described above). Thus, different product classes have different templates based on the respective schemas of each product class. Like the schemas of different product classes, the import templates will include some common product specification fields across all product classes, such as product name, product model year and MSRP. The bulk upload component 315 supports templates in a variety of formats, including but not limited to, for example, CSV format, XLS format, and XML format. In other embodiments, other data formats can be used as well.

A manufacturer then uses the template to create an import file (CSV, XLS, or XML format) (or changes the file exported with the export tool), in which the template is used to provide product specification data for multiple products in the particular product class. The data for each product is provided in the file, using the template for the data of each successive product. The import file is then transmitted from the manufacturer's client computer (e.g., 105a) to the server 110. This can be done through a variety of protocols including loading via HTTP, sending via File Transfer Protocol (FTP), emailing the file, or using a proprietary protocol.

After receiving the file, the bulk upload component 315 parses the import file, reads the product specification data for each product, and uses that structure to add or update the corresponding database records. When parsing the import file, the bulk upload component 315 may perform some intelligent checks. For example, it may check whether the format of the received file matches the template for products of the given product class, and it may also check whether any field has invalid data. When updating the database, the bulk upload component 315 may map a manufacturer's broadly acceptable values to the database's acceptable values. For example, "Y", "Yes", "YES", and "1"may all map to a value of "1"in the database. The component 315 may fill in certain default values if the manufacturer leaves a particular field blank, and may permit the manufacturer to specify that certain fields be ignored when updating so as not to erase previous values when a field of the new data feed is blank. When the import file is provided in XML format, the component 315 may perform XML validation to verify that the file is in the proper XML format. Other additional validation of the data may also be performed such as, range checking, data type checking, required fields being present, and the like.

Every product class template includes one field for a product model string. Typically, this string is the SKU used by the manufacturer for a given product. This field must be unique across all products from a given manufacturer. This enables the bulk upload component 315 to determine if a particular import file contains an insert or an update for a given product. The product class of a given feed can be determined automatically from the template fields of the file being imported.

The bulk upload component 140 may report errors that occur during the upload process, and may also give the reason for each error. When the upload completes for protocols such as http, a summary is returned to the manufacturer, reporting how many products have been inserted into the database, how many products have been updated, what the success rate is, and whether any errors occurred. The bulk upload component 315 also writes logs to the database 120 during the bulk upload process to record the status of any updates. This is useful for asynchronous protocols such as FTP or email. For these protocols the system might send a confirmation e-mail of the load status. A MAT administrator may later query the log to track upload histories of all manufacturers. Each manufacturer, however, can only view its own upload history.

Appendix A is an example of a product template based on a product schema for a product class called "DVD Player". This template is in XML format. Appendix B is an example of an import file containing specification data for multiple products in the "DVD Player" class, each product entry in the file conforming to the template of Appendix A. As mentioned above, however, the exemplary template and exemplary import file can also be created in an Excel spreadsheet format, in which the fields of the schema each define a separate column in the spreadsheet, and wherein the specification data (i.e., the values of each field) of a product are entered as a single row in the spreadsheet. Alternatively, the exemplary template and import file may be generated in a CSV format. Other formats are also possible.

FIGS. 4 through 10 illustrate further details of an embodiment of a graphical user interface (GUI) of the Manufacturer Administration Tool 140 of FIG. 3. In this embodiment, the GUI comprises a series of Web pages that a client accesses and interacts with using a browser application.

Figure 4:
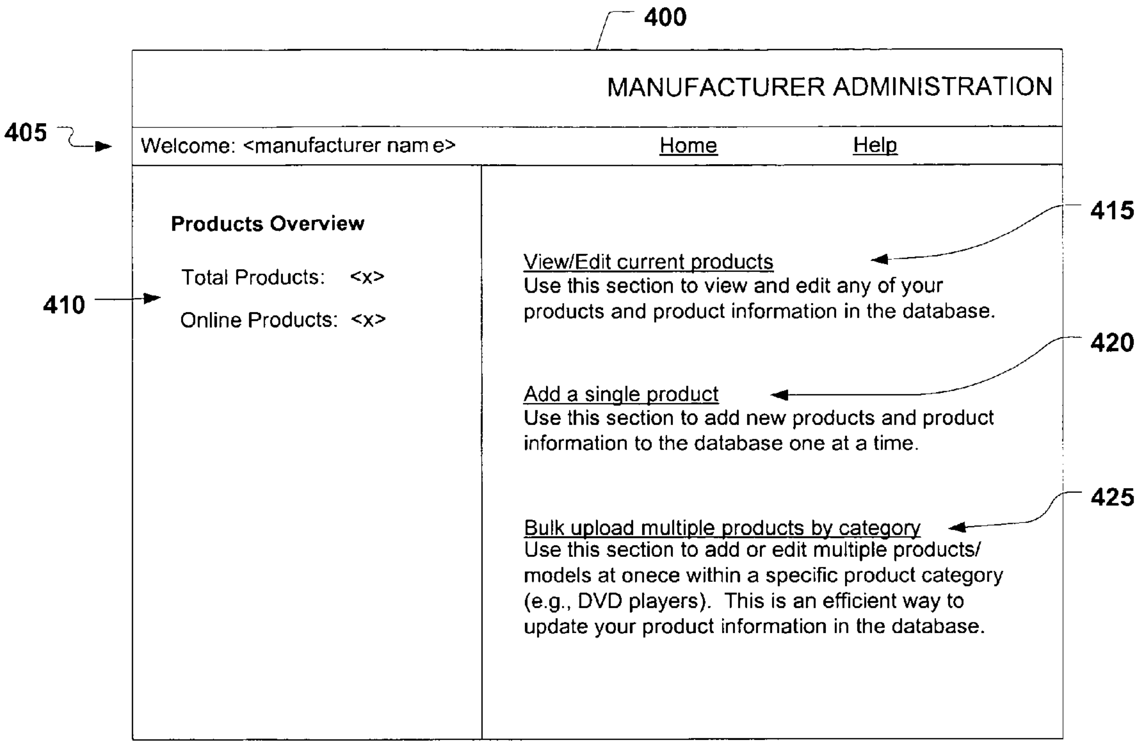

FIG. 4 is a graphical representation of the main page 400 of the GUI, which is presented to a manufacturer after a successful logon. A title bar 405 identifies the manufacturer and provides links to other pages of the interface (e.g., home, help). A brief summary of the number of product records the manufacturer has stored in the database 120 is provided at 410. On the opposite side of the page, links to three other functions of the GUI are provided. Specifically, a "View/Edit current products" link 415 will invoke the user interface page(s) of the product search and listing component 305 of the MAT 140, a "Add a single product" link 420 will invoke the user interface page(s) of the single products editing component 310, and a "Bulk upload multiple products by category" link 425 will invoke the user interface page(s) of the bulk upload component 315.

Figure 5:
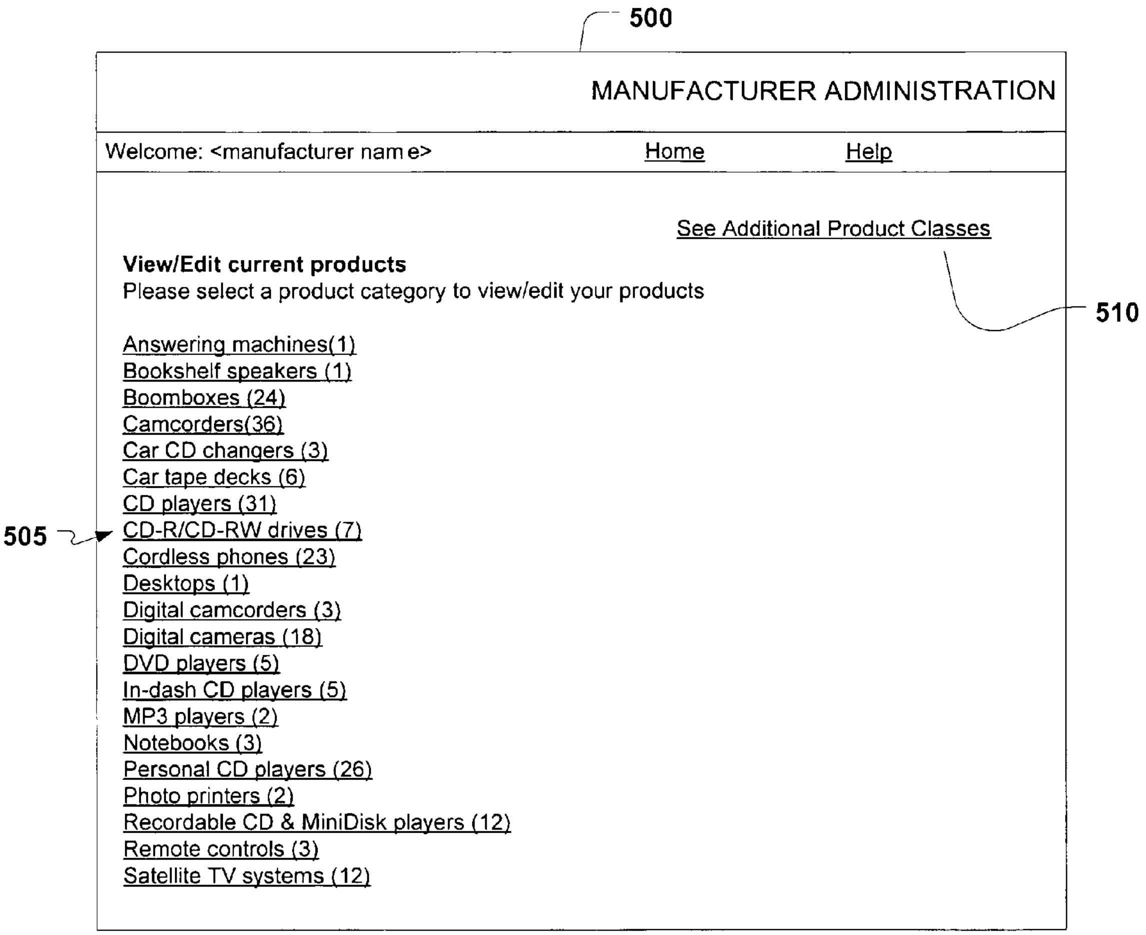

FIG. 5 is a graphical representation of a page 500 of the GUI that is displayed when a manufacturer clicks on link 415 of the main page 400. At 505, this page 500 displays a list (in the form of a series of Web page links) of all product classes in which the manufacturer has product records in the database 120. The manufacturer can then click on one of the product class links to view a page listing more detailed information for the manufacturer's products in that class. A "see additional product classes" link 510 is provided in the event that the manufacturer wants to load data for a product class for which it has not yet stored any data.

Figure 6:
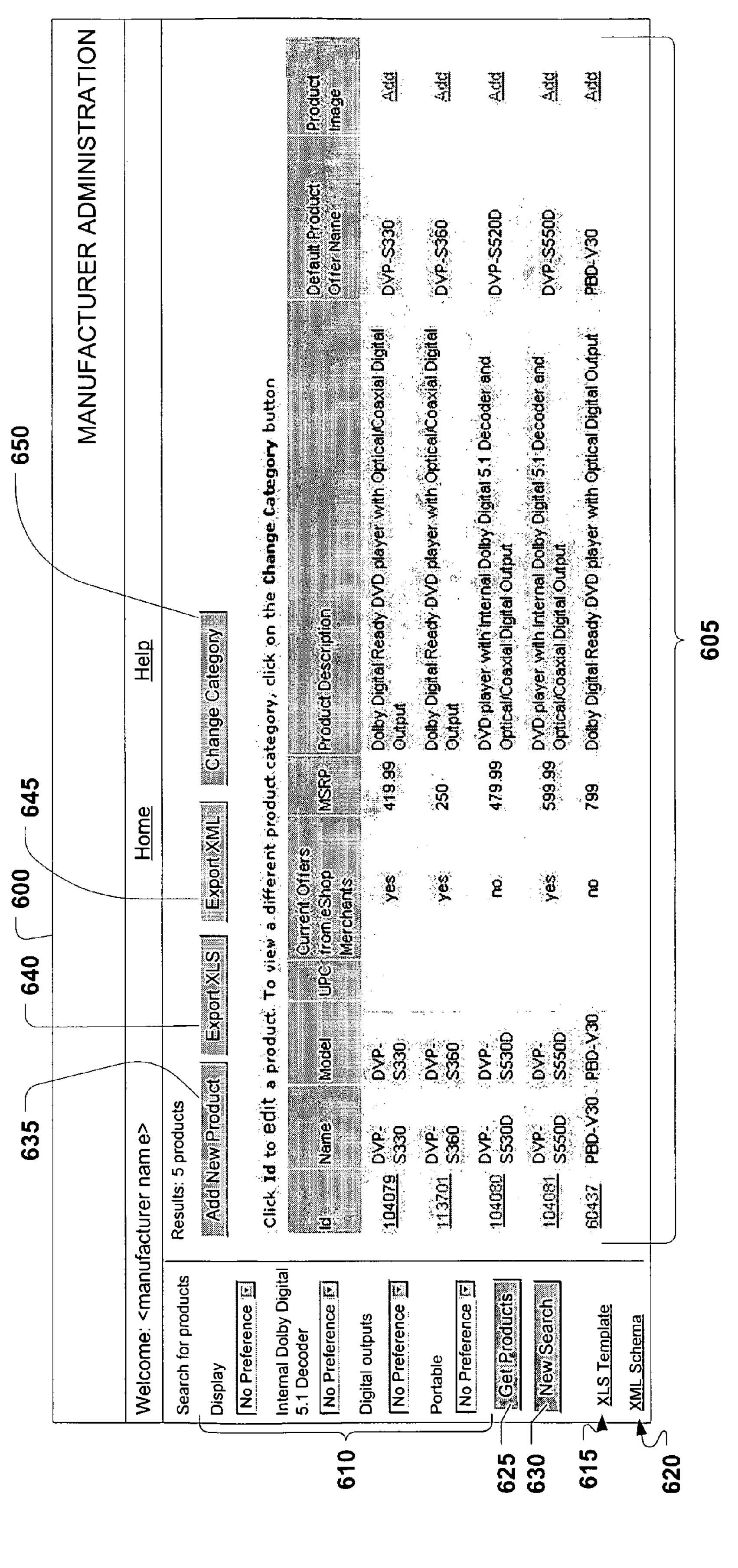

FIG. 6 is a graphical representation of a page 600 which, for example, might be displayed by clicking the "DVD players (5)"link of the page 500 of FIG. 5. As shown, at 610 of the page 600, the product search and listing component 305 provides a series of search filters based on the schema of the selected product class to enable the manufacturer to further refine the search for products in this class. For example, the manufacturer may want to view only those DVD player products that are portable. Selecting that preference at 610 and then clicking the button entitled "Get Products" will pull up a sub-list of products that satisfy the search criteria at 610. Clicking the "New Search"button 630 will clear the filter fields to enable the manufacturer to specify new values for each field. The "Add New Product" button 635 invokes the single products editing component 310 for adding specification data for a new product in this class. Clicking on the product ID of any one of the products in the current list of products will also invoke the single products editing component 310 to enable the manufacturer to modify the product specification data for that product. The "Export XLS" and "Export XML" buttons 640, 645 allow the manufacturer to export the current list in either the XLS format or the XML format, respectively. A "Change Category" button 650 sends the manufacturer back to the previous page 500 for selection of a new product class. Links 615 and 620 are provided to enable the manufacturer to download the current XLS and XML format templates for the current product class for use in providing a bulk upload of product specification data.

Figure 7B:
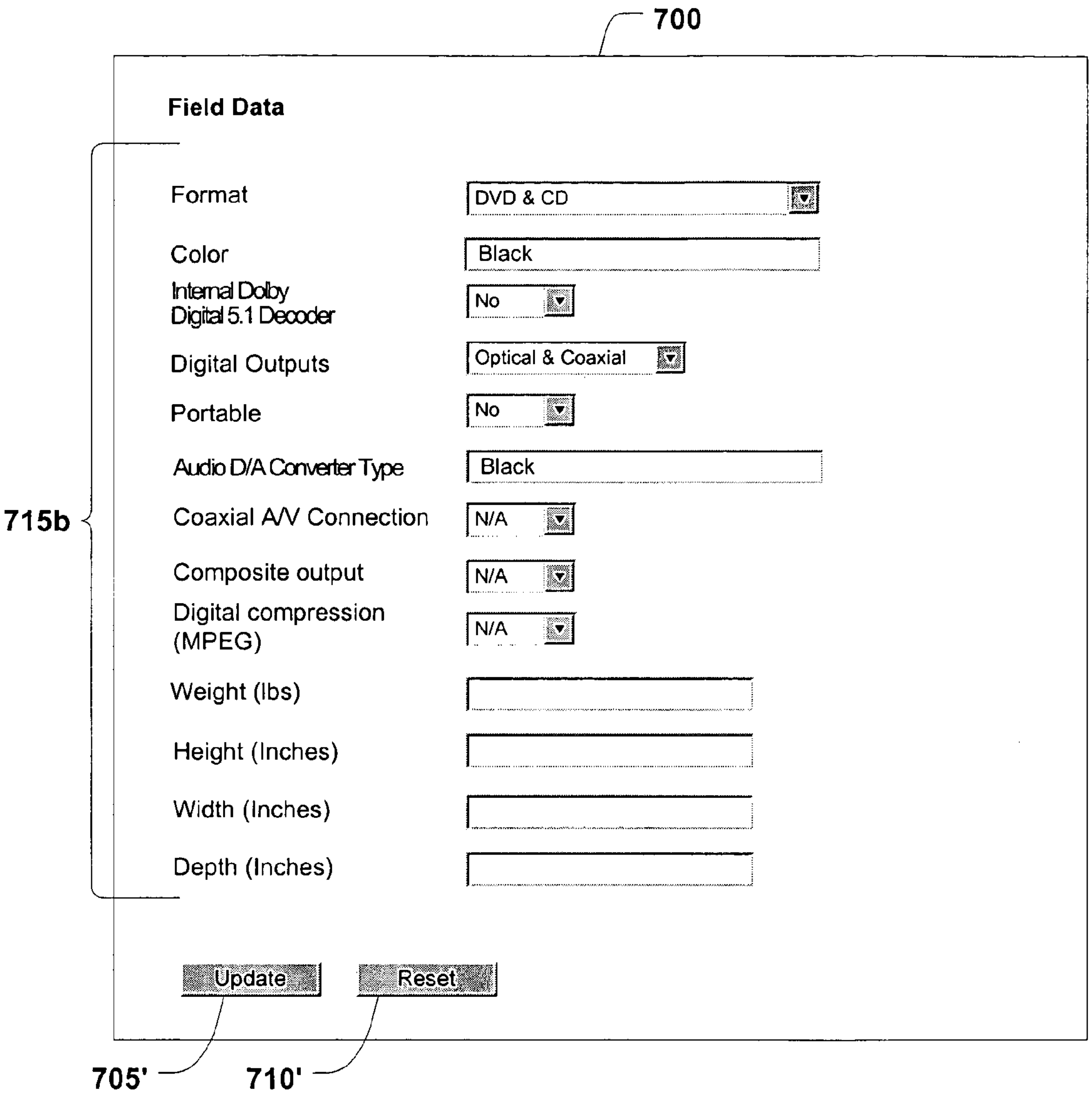

FIGS. 7*a* and 7*b* are a graphical representation of an edit page displayed by the single products editing component 310, for example, in response to the manufacturer clicking on the product ID of one of the DVD players listed in the exemplary listing on page 600 of FIG. 6. The entries at 715*a* and 715*b* are generated by the editing component 310 from the schema for this product class. As is the case for all product classes, the field entries at 715*a* are common to all product classes, whereas the field entries at 715*b* are specific to the current product class, which in this example is "DVD Player." The manufacturer can change the values in one or more fields and then click on the "Update" button 705 to commit the changes to the database 120. Alternatively, the manufacturer can click on the "Reset" button 710 to reset all of the fields. As shown in this example, the manufacturer has provided values for many of the fields, but has left other fields blank.

Due to the flexible design of the embodiment of the database 120 illustrated in FIG. 2, it is very easy to add a new field to a product class. The MAT 140 will automatically generate a revised template for the product class schema and any changes will also be reflected in any editing page 700 generated from the schema. A manufacturer can always download the most current template (in XLS or XML formats) using links 615 and 610 of the page 600 of FIG. 6.

Adding a single new product to the database is very similar to editing a product. A manufacturer clicks on the "Add a single product" link 420 of the main page 400 of FIG. 4. This causes a page (not shown) to be displayed that shows all product categories and classes. Once a product class has been selected, such as, for example, "DVD Player," the manufacturer is presented with an editing page that is very similar to that shown in FIGS. 7*a* and 7*b*, except that none of the fields are filled in. The manufacturer then fills-in the information and clicks on a button that causes the entered specification data to be added to a new record in the database 120.

FIG. 8 is a graphical representation of a page 800 of the GUI that is presented to the manufacturer by the bulk upload component 315 when the manufacturer clicks on the "Bulk upload multiple products by category" link 425 of the page 400 of FIG. 4 (which causes a list of available categories and classes to be displayed) and then selects one of the product classes for which to upload new product specification data. The upload bulk products category can be used to upload product specification data for new products in the product class or to modify existing data.

As shown, at 805 of the page 800, current information is provided concerning the total number of products that this manufacturer has stored in the database, as well as the number of products already stored in this particular product class. The manufacturer can download the current product class template in either XLS or XML format using one of the respective links shown at 810. The manufacturer can view its upload history by clicking the link at 812. A "Change Category" button 815 can be used to change to a different product class and category.

The manufacturer enters a directory path and filename of the import file to be uploaded in the edit item field 820. Once any fields to ignore have been specified in the list box 825, the manufacturer clicks on the "Upload" button to cause the bulk upload component 830 to retrieve the import file from the location specified in entry window 820. As described above, the bulk upload component 315 will then parse the received import file, read the product specification data for each product, and use that structure to add or update the corresponding database records. The component 315 will also perform the aforementioned data integrity checks and provide a log indicating any errors during the upload process. Note that in other embodiments, the upload file can be provided in other ways, such as through an FTP site, through an e-mail protocol, or through any other suitable means.

FIG. 9 is a graphical representation of a page 900 that is presented to the manufacturer when the link at 812 of page 800 is clicked, as well as to an administrator of the server 110 via a server administrator link (not shown). This page allows the manufacturer or a server administrator to specify certain parameters of the upload history information that the manufacturer or administrator wishes to view. For example, at 905, an administrator can select whether to view the current manufacturer's bulk upload history or the histories for all manufacturers. A manufacturer, however, can only view its own upload history and so the latter option is not available to a manufacturer. At 910, the manufacturer or administrator can select to view the history of only the last upload event, or a history of all past upload events. At 915, the manufacturer or administrator can select several different options concerning how the upload history information will be sorted. Once the appropriate selections have been made, the manufacturer or administrator clicks on the "Get Log" button 920 to view the history information.

Figure 10:
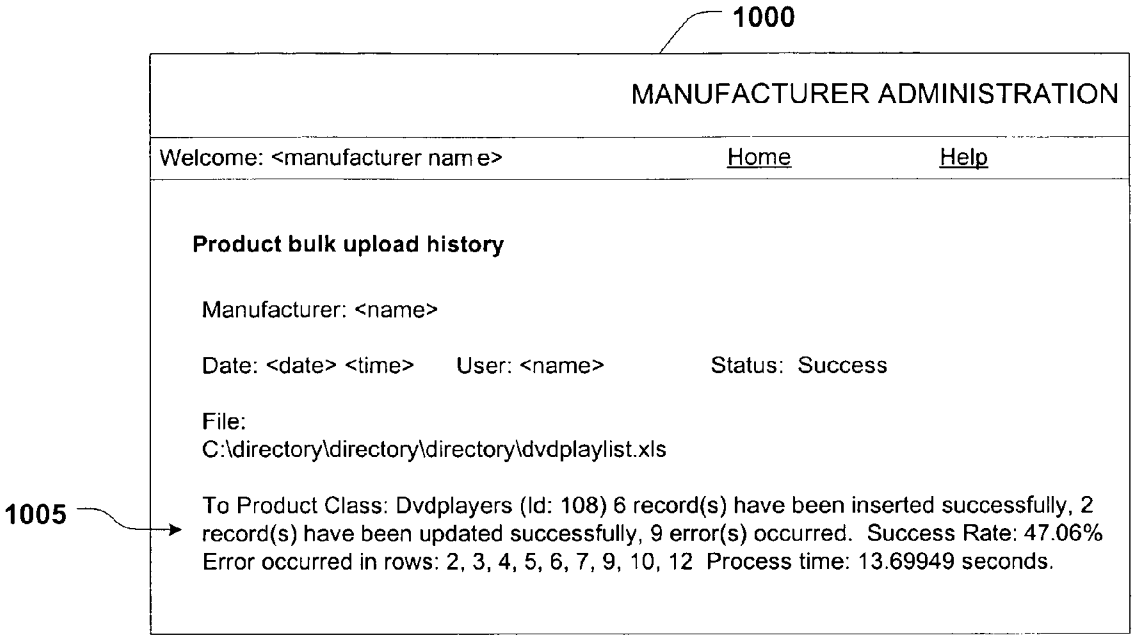

FIG. 10 is a graphical representation of an exemplary page 1000 that the bulk upload component 315 might present to a manufacturer or administrator to display the upload history for a given upload event. The information displayed includes the manufacturer name, the date of the upload event, an indication of whether the upload was successful, the location and name of the import file provided by the manufacturer, and a summary (at 1005) of the event history. The summary 1005 may indicate which product class the product information relates to, the number or records successfully inserted or updated, the number of errors encountered and the specific rows (i.e., product records) in the import file in which those errors occurred, the overall success rate of the upload event, and the processing time required to perform the upload.

While in the embodiments described above, manufacturers use the MAT 140 to upload product information to the Manufacturers Product Database, in other embodiments, the data may be "pulled" from the manufacturers. For example, the MAT 140 may access (e.g., "crawl") a Web site of the manufacturer and extract product information data from unstructured HTML (or text or quark files), format the data in accordance with a particular product class schema, and then insert the data into the database 120. Alternatively, the manufacturer could supply an unstructured data file, such as a marketing brochure for a product, and the MAT 140 could scan the document, extract the pertinent product specification data, place the information in the appropriate product class schema format, and then insert the data in to the database 120.

Figure 12:
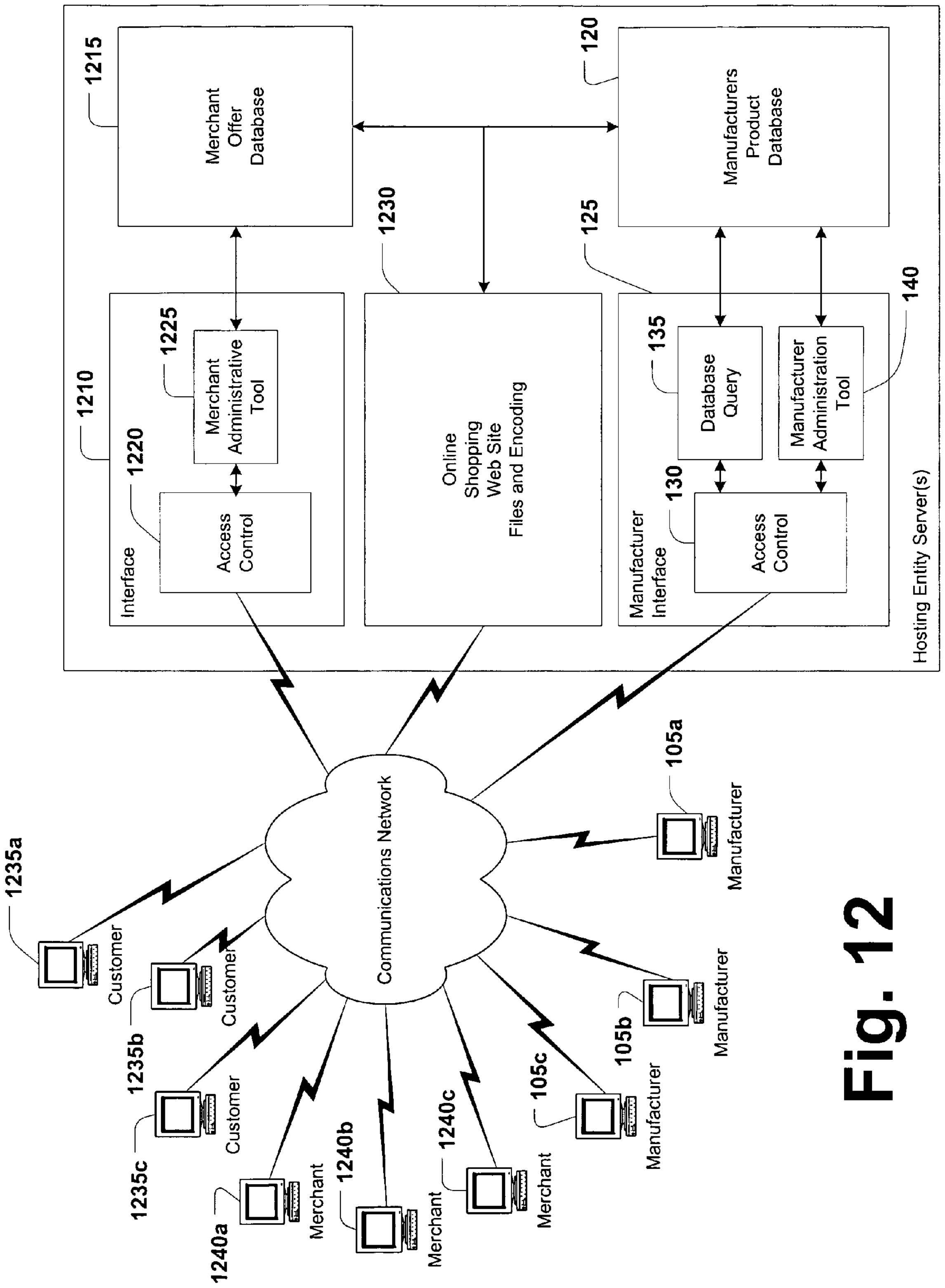
FIG. 12 illustrates the incorporation of the present invention into an exemplary online merchandizing Web site, in accordance with a further aspect of the present invention.

FIG. 12 is a block diagram illustrating how the system 100 of FIG. 1 may be integrated into other business models, in accordance with a further aspect of the present invention. In the example shown, the system has been integrated into a Web site that provides online shopping or merchandizing services. The Web site enables merchants, e.g., merchants 1240*a-c*, to submit offers for sale of products of various manufacturers (e.g., manufacturers 105*a-c*) to the Web site for display by the Web site to potential customers (e.g., customers 1235*a-c*). For example, a merchant called "scanners-r-us" may wish to have the Web site display an offer for sale by it of a particular flatbed scanner device manufactured by a given manufacturer. The merchant uses an interface 1210, which comprises an access control component 1220 and a Merchant Administrative Tool 1225, to submit an offer(s) to be stored by the Web site in a Merchant Offer Database 1215. The files and encoding 1230 of the Web site may then display on a Web page of the site, in any of a variety of formats and combinations, selected offers from selected merchants.

Figure 12A:
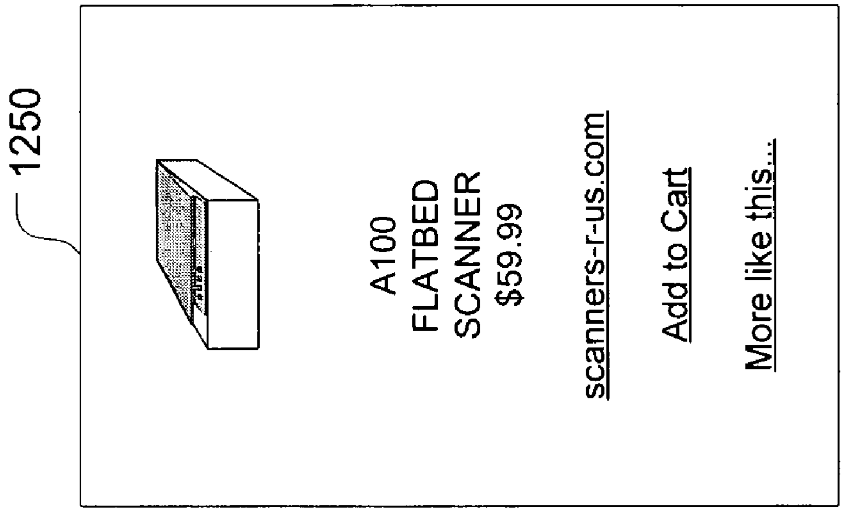
FIG. 12*a* illustrates an exemplary merchant offer that may be displayed by the Web site of FIG. 12.

FIG. 12*a* is an example of how a particular product offer may be displayed. This display represents an offer for sale of a flatbed scanner device of a particular manufacturer (e.g., the A100 Flatbed Scanner) by a merchant called "scanners-r-us.com." The merchant submits the information about the offer, such as the product name, offer price, length of time the offer is valid, and other information to the Merchant Offer Database using the Merchant Administrative Tool 1225. Like the Manufacturer Administration Tool 140, the Merchant Administration Tool 1225 can import and export product offer information in a variety of formats (e.g., CSV, XLS, XML, and the like) via a variety of communication protocols (e.g., HTTP, FTP, e-mail, and the like). Merchant offer information can be added or edited a single offer at a time using the Tool 1225 or using a bulk upload capability like that provided by the Manufacturer Administration Tool 140. A single schema is used by all merchants to submit offers to the database 1215, ensuring a common format among all merchants.

Referring again to FIG. 12, the offers stored in the Merchant Offer Database 1215 are preferably correlated, or mapped, to the respective product specification data in the Manufacturers Product Database 120. For example, the offer depicted in FIG. 12*a* by the merchant "scanners-r-us.com" will be stored in the Merchant Offer Database 1215 and will be mapped to the product specification data in the Manufacturers Product Database 120 for the product being offered (e.g., the A100 Flatbed Scanner). The mapping is bidirectional. This has a number of advantages. For example, the Web site can display a specific product from a particular manufacturer with a "where to buy this product" link that would then query the Merchant Offer Database 1215 and display all merchant offers for that product. This can extend to online merchants or to local merchants (e.g., via a "click here to see where you can buy this product near you" link). Additionally, for each offer displayed on a Web page of the site, a link can be provided to the product specification data for that product to enable customers to make more informed purchasing decisions and to compare offers from different merchants for the same product or compare like products from different manufacturers in a same product class. Because all manufacturers are required to use the same product class schema to describe the features and specifications of their products in a given product class, the Web site provides a more meaningful comparison shopping experience.

In the context of the online shopping Web site illustrated in FIG. 12, the remuneration given to the hosting entity (in this case the Web site operator) for use by the manufacturers of the manufacturers interface 125 and database 120 may take the form of permission from the manufacturers to the Web site to use the product specification data in connection with merchant offers displayed to consumers by the Web site. Moreover, because the manufacturers also derive a significant benefit from the Web site as a form of distribution outlet for their products, the Web site may further charge the manufacturers additional fees or other charges for this benefit.

Although not required, the methods of the present invention and the components of the system of the present invention, including the database 120, the interface 125, and/or any of its individual components, including the access control component 130 and the components 305, 310, and 315 of the MAT 140, may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. Aspects of the present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 11:
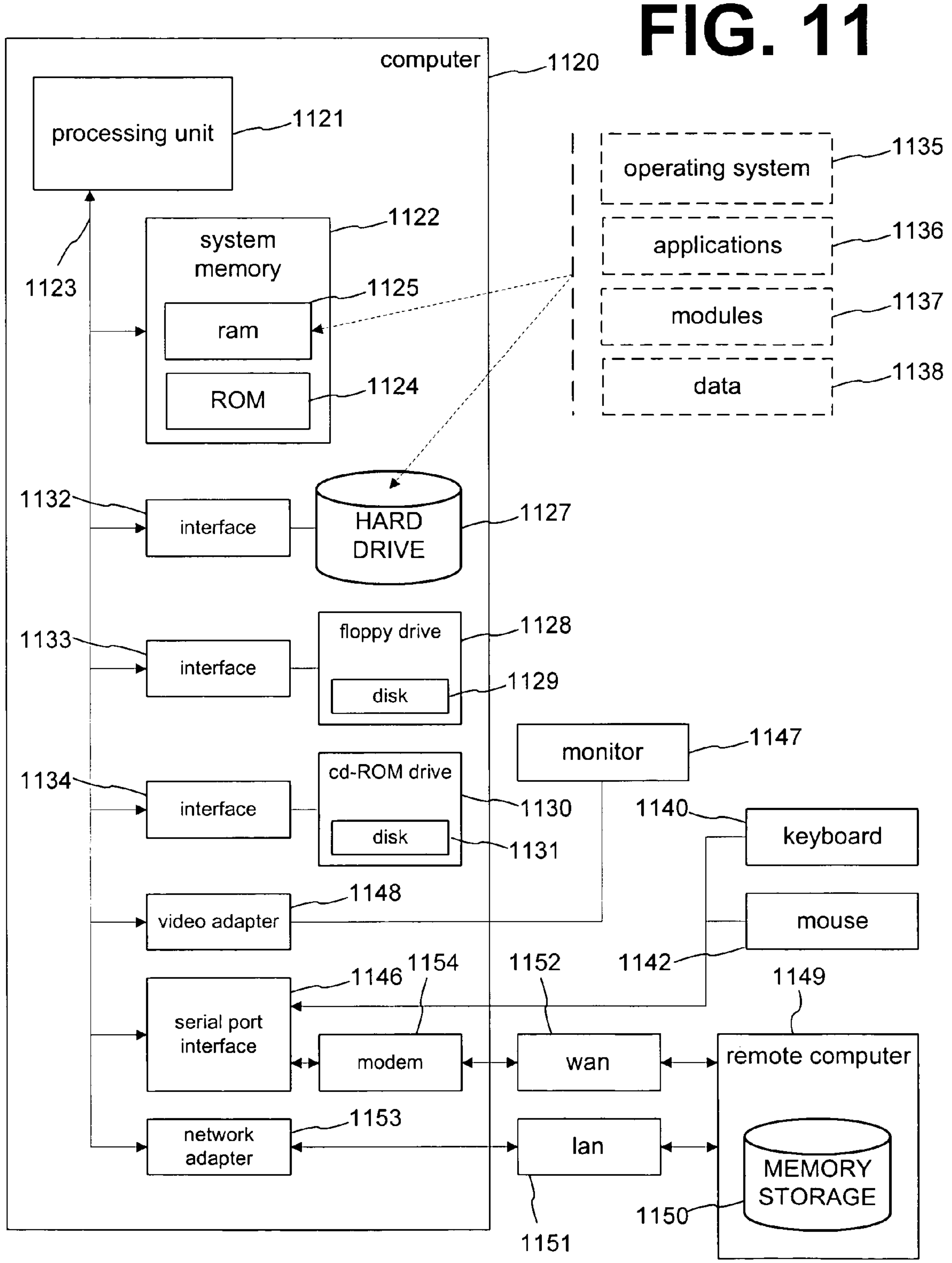
FIG. 11 illustrates an exemplary computer system in which the present invention can be implemented.

FIG. 11 illustrates an exemplary computing environment in which the program code that embodies the methods or system of the present invention may be executed. Those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program code and program modules comprising program code may be located in both local and remote memory storage devices.

With reference to FIG. 11, an exemplary system for implementing the invention includes a general purpose computing device in the form of a conventional computer 1120, including a processing unit 1121, a system memory 1122, and a system bus 1123 that couples various system components including the system memory to the processing unit 1121. The system bus 1123 may be any of several types of bus structures including a memory bus or memory controller, a peripheral bus, and a local bus using any of a variety of bus architectures. The system memory includes read only memory (ROM) 1124 and random access memory (RAM) 1125. A basic input/output system 1126 (BIOS), containing the basic routines that helps to transfer information between elements within the computer 1120, such as during start-up, is stored in ROM 1124. The computer 1120 further includes a hard disk drive 1127 for reading from and writing to a hard disk, not shown, a magnetic disk drive 1128 for reading from or writing to a removable magnetic disk 1129, and an optical disk drive 1130 for reading from or writing to a removable optical disk 1131 such as a CD ROM or other optical media. The hard disk drive 1127, magnetic disk drive 1128, and optical disk drive 1130 are connected to the system bus 1123 by a hard disk drive interface 1132, a magnetic disk drive interface 1133, and an optical drive interface 1134, respectively. The drives and their associated computer-readable media provide nonvolatile storage of computer readable instructions, data structures, program modules and other data for the computer 1120. Although the exemplary environment described herein employs a hard disk, a removable magnetic disk 1129 and a removable optical disk 1131, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 1129, optical disk 1131, ROM 1124 or RAM 1125, including an operating system 1135, one or more application programs 1136, other program modules 1137, and program data 1138. A user may enter commands and information into the computer 1120 through input devices such as a keyboard 1140 and pointing device 1142. Other input devices (not shown) may include a microphone, joystick, game pad, satellite dish, scanner, or the like. These and other input devices are often connected to the processing unit 1121 through a serial port interface 1146 that is coupled to the system bus, but may be connected by other interfaces, such as a parallel port, game port or a universal serial bus (USB). A monitor 1147 or other type of display device is also connected to the system bus 1123 via an interface, such as a video adapter 1148. In addition to the monitor, computers typically include other peripheral output devices (not shown), such as speakers and printers.

The computer 1120 may operate in a networked environment using logical connections to one or more remote computers, such as a remote computer 1149. The remote computer 1149 may be another computer, a server, a router, a network PC, a peer device or other common network node, and typically includes many or all of the elements described above relative to the computer 1120, although only a memory storage device 1150 has been illustrated in FIG. 11. The logical connections depicted in FIG. 11 include a local area network (LAN) 1151 and a wide area network (WAN) 1152. Such networking environments are commonplace in offices, enterprise-wide computer networks, intranets and the Internet.

When used in a LAN networking environment, the computer 1120 is connected to the local network 1151 through a network interface or adapter 1153. When used in a WAN networking environment, the computer 1120 typically includes a modem 1154 or other means for establishing communications over the wide area network 1152, such as the Internet. The modem 1154, which may be internal or external, is connected to the system bus 1123 via the serial port interface 1146. In a networked environment, program modules depicted relative to the computer 1120, or portions thereof, may be stored in the remote memory storage device. It will be appreciated that the network connections shown are exemplary and other means of establishing a communications link between the computers may be used.

As the foregoing illustrates, the present invention is directed to a business model in which one entity hosts, maintains, and provides a uniform interface for entering data into, a database of manufacturers product specification on behalf of a plurality of manufacturers, and that then serves as an application service provider (ASP) with respect to that database, by allowing the manufacturers to access their respective product specification data in the database for any of a variety of uses in exchange for some form of remuneration from those manufacturers. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

APPENDIX A

```
<?xml version=“1.0” encoding=“iso-8859-1” ?>
-<Schema name=“DVDPlayer” xmlns=“urn:schemas-microsoft-com:xml-data”
    xmlns:dt=“urn:schemas-microsoft-com:datatypes”>
  -<ElementType name=“DVDPlayers” content=“eltOnly”>
      <element type=“DVDPlayer” minOccurs=“0” maxOccurs=“*” />
  </ElementType>
  -<ElementType name=“DVDPlayer” content=“eltOnly”>
      <element type=“MSNProdId” minOccurs=“0” maxOccurs=“1” />
      <element type=“ProdName” minOccurs=“1” maxOccurs=“1” />
      <element type=“ProdModel” minOccurs=“1” maxOccurs=“1” />
      <element type=“ProdModelYear” minOccurs=“0” maxOccurs=“1” />
      <element type=“ProdReferenceImageURL” minOccurs=“0” maxOccurs=“1” />
      <element type=“ProdMSRP” minOccurs=“0” maxOccurs=“1” />
      <element type=“ProdDesc” minOccurs=“0” maxOccurs=“1” />
      <element type=“ProdUPC” minOccurs=“0” maxOccurs=“1” />
      <element type=“Prod Display” minOccurs=“0” maxOccurs=“1” />
      <element type=“Format” minOccurs=“0” maxOccurs=“1” />
      <element type=“Color” minOccurs=“0” maxOccurs=“1” />
```

APPENDIX A-continued

```
        <element type="InternalDolbyDigital51Decoder" minOccurs="0" maxOccurs="1" />
        <element type="DigitalOutputs" minOccurs="0" maxOccurs="1" />
        <element type="Portable" minOccurs="0" maxOccurs="1" />
        <element type="AudioDAConverterType" minOccurs="0" maxOccurs="1" />
        <element type="CoaxialAVConnection" minOccurs="0" maxOccurs="1" />
        <element type="CompositeOutput" minOccurs="0" maxOccurs="1" />
        <element type="DigitalCompressionMPEG" minOccurs="0" maxOccurs="1" />
        <element type="Weight" minOccurs="0" maxOccurs="1" />
        <element type="Height" minOccurs="0" maxOccurs="1" />
        <element type="Width" minOccurs="0" maxOccurs="1" />
        <element type="Depth" minOccurs="0" maxOccurs="1" />
    </ElementType>
    -<ElementType name="MSNProdId" content="empty">
        <AttributeType name="value" dt:type="int" />
        <attribute type="value" />
    </ElementType>
    <ElementType name="ProdName" content="textOnly" />
    <ElementType name="ProdModel" content="textOnly" />
    -<ElementType name="ProdModelYear" content="empty">
        <AttributeType name="value" dt:type="int" />
        <attribute type="value" />
    </ElementType>
    -<ElementType name="ProdReferenceImageURL" content="empty">
        <AttributeType name="value" dt:type="uri" />
        <attribute type="value" />
    </ElementType>
    -<ElementType name="ProdMSRP">
        <AttributeType name="value" dt:type="float" />
        <attribute type="value" />
    </ElementType>
    <ElementType name="ProdDesc" content="textOnly" />
    <ElementType name="ProdUPC" content="textOnly" />
    -<ElementType name="ProdDisplay" content="empty">
        <AttributeType name="value" dt:type="boolean" default="1" />
        <attribute type="value" />
    </ElementType>
    -<ElementType name="Format" content="empty">
        <AttributeType name="value" dt:type="enumeration" dt:values=All DIVXandDVD
            DVDandCD DVDandVCD DVDandDIVXandCD DVDandLDandCD
            DVDandLDandVCDandCD DVDandVCDandCD NoPreference" />
        <attribute type="value" />
    </ElementType>
    <ElementType name="Color" content="textOnly" />
    -<ElementType name="InternalDolbyDigital51Decoder" content="empty">
        <AttributeType name="value" dt:type="boolean" default="0" />
        <attribute type="value" />
    </ElementType>
    -<ElementType name="DigitalOutputs" content="empty>
        <AttributeType name="value" dt:type="enumeration" dt:values="Coaxial Optical
            OpticalAndCoaxial" />
        <attribute type="value" />
    </ElementType>
    -<ElementType name=Portable" content="empty>
        <AttributeType name="value" dt:type"boolean" default="0" />
        <attribute type="value" />
    </ElementType>
    <ElementType name="AudioDAConverterType" content="textOnly" />
    -<ElementType name="CoaxialAVConnection" content="empty">
        <AttributeType name="value" dt:type="boolean" default="0" />
        <attribute type="value" />
    </ElementType>
    -<ElementType name="CompositeOutput" content="empty">
        <AttributeType name="value" dt:type="boolean" default="0" />
        <attribute type="value" />
    </ElementType>
    -<ElementType name="DigitalCompressionMPEG" content="empty">
        <AttributeType name="value" dt:type="boolean" default="0" />
        <attribute type="value" />
    </ElementType>
    -<ElementType name="Weight" content="empty">
        <AttributeType name="value" dt:type="float" />
        <attribute type="value" />
    </ElementType>
    -<ElementType name="Height" content="empty">
        <AttributeType name="value" dt:type="float" />
        <attribute type="value" />
    </ElementType>
    -<ElementType name="Width" content="empty">
        <AttributeType name="value" dt:type="float" />
```

APPENDIX A-continued

```
        <attribute type="value" />
    </ElementType>
    -<ElementType name="Depth" content="empty">
        <AttributeType name="value" dt:type="float" />
        <attribute type="value" />
    </ElementType>
</Schema>
```

APPENDIX B

```
<?xml version="1.0" encoding="iso-8859-1" ?>
-<BizTalk>
    -<Body>
        -<DVDPlayers
            xmlns="urn:http://www.merchant.shopmsn.microsoft.com/offerschema.xml?
            pcId=146">
            -<DVDPlayer>
                <MSNProdId>104079</MSNProdId>
                <ProdName>DVP-S330</ProdName>
                <ProdModel>DVP-S330</ProdModel>
                <ProdModelYear />
                <Prod ReferenceImageURL />
                <ProdMSRP>419.99</ProdMSRP>
                <ProdDesc>Dolby Digital Ready DVD player with Optical/Coaxial Digital
                    Output</ProdDesc>
                <ProdUPC />
                <ProdDisplay>1</ProdDisplay>
                <Format>DVDandCD</Format>
                <Color />
                <InternalDolbyDigital51Decoder value="0" />
                <DigitalOutputs>OpticalAndCoaxial</DigitalOutputs>
                <Portable value="0" />
                <AudioDAConverterType>96kHz/24-bit</AudioDAConverterType>
                <CoaxialAVConnection value=" " />
                <CompositeOutput value=" " />
                <DigitalCompressionMPEG value=" " />
                <Weight />
                <Height />
                <Width />
                <Depth />
            </DVDPlayer>
            -<DVDPlayer>
                <MSNProdId>113701</MSNProdId>
                <ProdName>DVP-S360</ProdName>
                <ProdModel>DVP-S360</ProdModel>
                <ProdModelYear />
                <ProdReferenceImageURL />
                <ProdMSRP>250</ProdMSRP>
                <ProdDesc>Dolby Digital Ready DVD player with Optical/Coaxial Digital
                    Output</ProdDesc>
                <ProdUPC />
                <ProdDisplay>1</ProdDisplay>
                <Format>DVDandVCDandCD</Format>
                <Color>Black</Color>
                <InternalDolbyDigital51Decoder value="0" />
                <DigitalOutputs>OpticalAndCoaxial</DigitalOutputs>
                <Portable value="0" />
                <AudioDAConverterType>96kHz/24-bit</AudioDAConverterType>
                <CoaxialAVConnection value="1" />
                <CompositeOutput value="1" />
                <DigitalCompressionMPEG value=" " />
                <Weight>Info. Not Available</Weight>
                <Height>Info. Not Available</Height>
                <Width>Info. Not Available</Width>
                <Depth>Info. Not Available</Depth>
            </DVDPlayer>
            -<DVDPlayer>
                <MSNProdId>104080</MSNProdId>
                <ProdName>DVP-S530D</ProdName>
                <ProdModel>DVP-S530D</ProdModel>
                <ProdModelYear />
                <ProdReferenceImageURL />
                <ProdMSRP>479.99</ProdMSRP>
                <ProdDesc>DVD player with Internal Dolby Digital 5.1 Decoder and
                    Optical/Coaxial Digital Output</ProdDesc>
                <ProdUPC />
```

APPENDIX B-continued

```
        <ProdDisplay>1</ProdDisplay>
        <Format>DVDandCD</Format>
        <Color />
        <InternalDolbyDigital51Decoder value="1" />
        <DigitalOutputs>OpticalAndCoaxial</DigitalOutputs>
        <Portable value="0" />
        <AudioDAConverterType>96kHz/24-bit</AudioDAConverterType>
        <CoaxialAVConnection value=" " />
        <CompositeOutput value=" " />
        <DigitalCompressionMPEG value=" " />
        <Weight />
        <Height />
        <Width />
        <Depth />
      </DVDPlayer>
     -<DVDPlayer>
        <MSNProdId>104081</MSNProdId>
        <ProdName>DVP-S550D</ProdName>
        <ProdModel>DVP-S550D</ProdModel>
        <ProdModelYear />
        <ProdReferenceImageURL />
        <ProdMSRP>599.99</ProdMSRP>
        <ProdDesc>DVD player with Internal Dolby Digital 5.1 Decoder and
          Optical/Coaxial Digital Output</ProdDesc>
        <ProdUPC />
        <ProdDisplay>1</ProdDisplay>
        <Format>DVDandCD</Format>
        <Color />
        <InternalDolbyDigital51Decoder value="1" />
        <DigitalOutputs>OpticalAndCoaxial</DigitalOutputs>
        <Portable value="0" />
        <AudioDAConverterType>96kHz/24-bit</AudioDAConverterType>
        <CoaxialAVConnection value=" " />
        <CompositeOutput value=" " />
        <DigitalCompressionMPEG value=" " />
        <Weight />
        <Height />
        <Width />
        <Depth />
      </DVDPlayer>
     -<DVDPlayer>
        <MSNProdId>60437</MSNProdId>
        <ProdName>PBD-V30</ProdName>
        <ProdModel>PBD-V30</ProdModel>
        <ProdModelYear>1/1/1999</ProdModelYear>
        <ProdReferenceImageURL />
        <ProdMSRP>799</ProdMSRP>
        <ProdDesc>Dolby Digital Ready DVD player with Optical Digital
          Output</ProdDesc>
        <ProdUPC />
        <ProdDisplay>1</ProdDisplay>
        <Format>DVDandVCDandCD</Format>
        <Color>Silver</Color>
        <InternalDolbyDigital51Decoder value="0" />
        <DigitalOutputs>Optical</DigitalOutputs>
        <Portable value="1" />
        <AudioDAConverterType>96kHz/20-bit</AudioDAConverterType>
        <Weight>1.25</Weight>
        <Height>5.9</Height>
        <Width>1.4</Width>
        <Depth>7.1</Depth>
      </DVDPlayer>
    </DVDPlayers>
  </Body>
</BizTalk>
```

What is claimed is:

1. A computer-implemented method comprising:

(a) hosting, on a server, a database of specification data of products of a plurality of different manufacturers, the product specification data in the database being arranged in a predefined product class;

(b) defining, for each product class, a schema for the entry of specification data of products in the product class;

(c) providing an interface comprising a tool, used by each product manufacturer, to add new product specification data into the database and to modify existing product specification data in the database, the interface tool requiring each manufacturer to use a same schema when entering and modifying product specification data in a particular product class, the interface further comprising an access control component which restricts any individual product manufacturer to view and edit only the product specification data corresponding to that individual product manufacturer; and (d) in exchange for remuneration from a given manufacturer, providing that manufacturer with query access to the given manufacturer's respective product specification data in the database to obtain the respective product specification data to use in combination with a web authoring tool and charging each manufacturer desiring to have access to the database a fee for such access.

2. The method recited in claim 1, wherein the fee is in the form ol a monetary payment.

3. The method recited in claim 2, wherein the fee comprises a one-time fee.

4. The method recited in claim 2, wherein the fee comprises a periodically recurring fee.

5. The method recited in claim 2, wherein the fee is based on usage of the database by the manufacturers.

6. The method recited in claim 5, wherein the fee for the given manufacturer is based on the volume of product information stored in the database by that manufacturer.

7. The method recited in claim 5, wherein the fee for the given manufacturer is based on the number of times that the manufacturer accesses the database to retrieve product specification data.

8. A computer system implemented by an application service provider (ASP), the system having product specification data of a plurality of manufacturers, comprising;

a database of specifications of products of the plurality of different manufacturers, the product specifications in the database being arranged in predefined product classes, and an interface comprising a tool, used by each product manufacturer, providing entry of specifications of products in a given product class, there being defined, for each product class, a schema providing specifications of products in that product class, the interface tool requiring each manufacturer to use the defined schema for a given product class when entering product specification data for products in that class, the interface further comprising an access control component which permits a manufacturer to view and edit only the product specification data corresponding to the accessing manufacturer;

the interface further permitting each manufacturer that provides remuneration to the (ASP) to access the manufacturer's respective product specification data in the database to use in combination with a web authoring tool and wherein the remuneration required to access the database comprises a fee paid by each manufacturer.

9. The system recited in claim 8, wherein the fee comprises a monetary payment.

10. The system recited in claim 8, wherein the fee comprises a one-time fee.

11. The system recited in claim 8, wherein the fee comprises a periodically recurring fee.

12. The system recited in claim 8, wherein the fee is based on usage of the database by the manufacturer.

13. The system recited in claim 12, wherein the fee for a given manufacturer is based on the volume of product information stored in the database by the manufacturer.

14. The system recited in claim 12, wherein the fee for a given manufacturer is based on a number of times that the manufacturer accesses the database to retrieve product specification data.

* * * * *

UNITED STATES PATENT AND TRADEMARK OFFICE

CERTIFICATE OF CORRECTION

PATENT NO. : 7,321,901 B1
APPLICATION NO. : 09/676365
DATED : January 22, 2008
INVENTOR(S) : Arnold N. Blinn et al.

It is certified that error appears in the above-identified patent and that said Letters Patent is hereby corrected as shown below:

In column 23, line 28, in Claim 2, delete “ol” and insert -- of --, therefor.

In column 23, line 45, in Claim 8, delete “comprising;” and insert -- comprising: --, therefor.

Signed and Sealed this
Fifteenth Day of February, 2011

David J. Kappos
*Director of the United States Patent and Trademark Office*